Inventor
Charles A. Campbell
By Dodge and Sons,
Attorneys

Inventor
Charles A. Campbell
By Dodge and Sons,
Attorneys

Patented Apr. 11, 1933

1,903,441

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

AIR BRAKE VALVE HOUSING

Application filed September 2, 1931. Serial No. 560,805.

This invention relates to air brakes, and will be described as applied to a triple valve structure, though it is applicable generally to air brake mechanisms where it is necessary to mount a filler piece or internal housing in sealed relation to a chamber or chambers formed partly in one housing and partly in another housing of a brake valve mechanism.

The invention has been successfully applied to the conversion of an ordinary K triple valve to an improved form characterized by delayed build-up of brake cylinder pressure during applications. In such case, the cylinder bushing and other parts associated with the emergency piston of the K triple valve are removed.

The chamber which formerly housed these parts and a companion chamber formed in a special lower case attached to the body of the triple valve receive a special housing which, in the particular example mentioned, is provided with a cylinder bushing and a valve chamber bushing forming parts of the delay build-up mechanism. The details of this mechanism are not a feature of the present invention which resides in the manner of mounting the insert so that it is sealed by a gasket to the body of the triple valve at its upper end, is sealed by a gasket to the lower case at its lower end, and is further sealed at or about its mid length by the gasket which also seals the joint between the body of the triple valve and the lower case.

An important feature of the invention is the arrangement of the parts in such manner that the insert is positively positioned by metal to metal engagement. From this it results that proper compression of all three gaskets against the insert is insured.

The invention will now be described with reference to the accompanying drawings, in which:—

Figure 1:
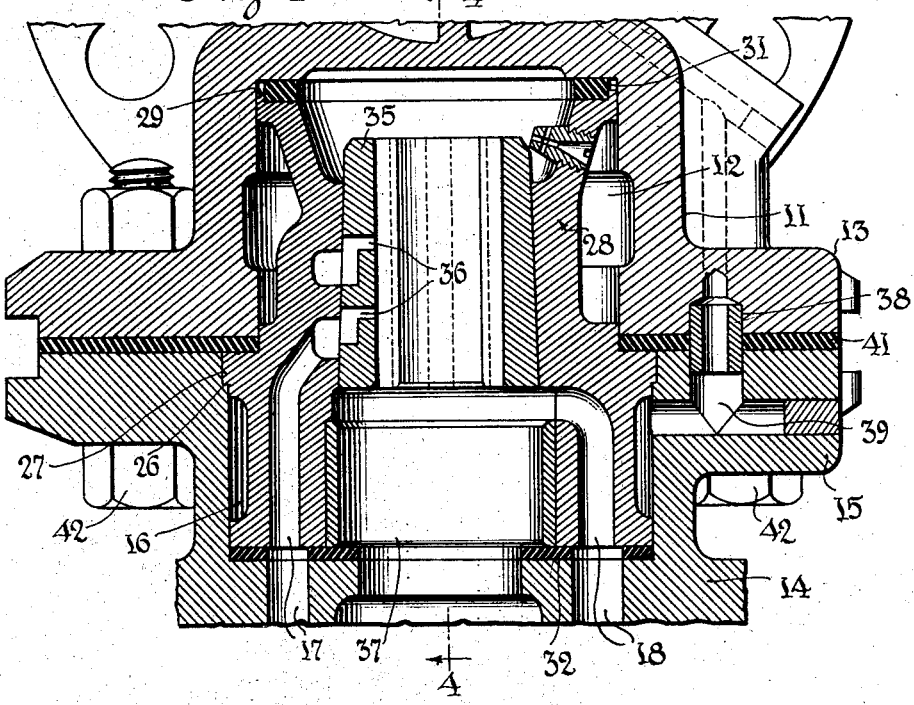
Fig. 1 is a vertical axial section through a portion of the triple valve body, lower case, and insert, the plane of section being transverse to the axis of the triple piston stem.
Figure 2:
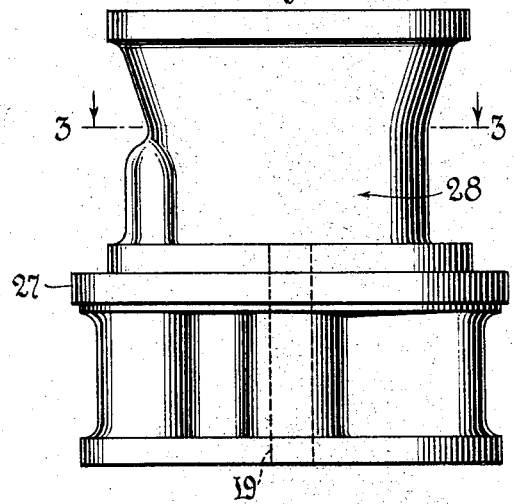
Fig. 2 is an elevation of the insert.
Figure 3:
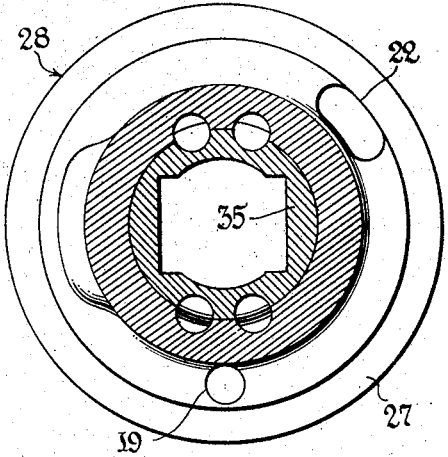
Fig. 3 is a section on the line 3—3 of Fig. 2.
Figure 4:
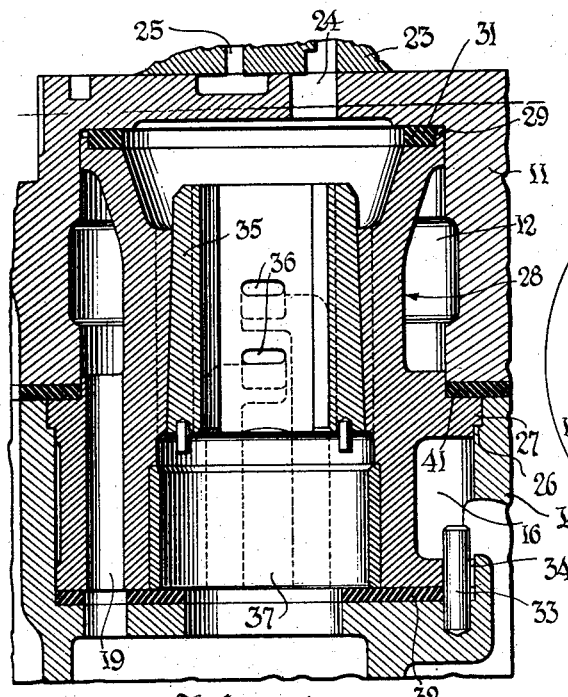
Fig. 4 is a section on the line 4—4 of Fig. 1.
Figure 5:
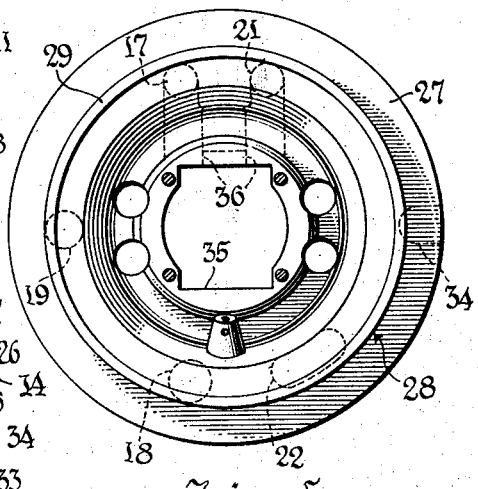
Fig. 5 is a plan view of the insert shown in Fig. 2.
Figure 6:
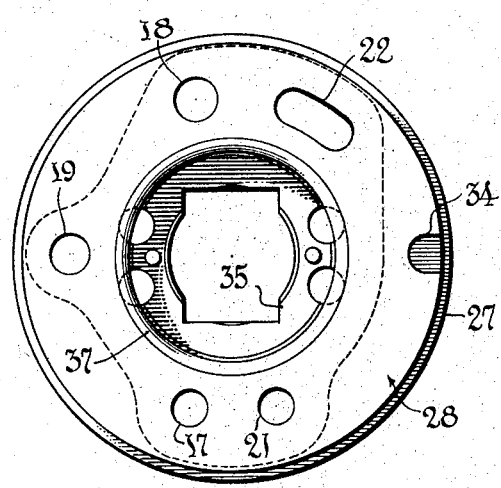
Fig. 6 is a view looking upward at the lower end of the insert shown in Fig. 2.

A portion of the body of a triple valve of the well known K—2 type is indicated at 11, and the chamber which in the K—2 triple houses the emergency piston and valve mechanism is indicated at 12. It will be understood that all this mechanism, including the cylinder bushing, is omitted or removed preparatory to the conversion of the valve to the modified form above mentioned.

13 represents the bolting flange for attaching the lower case of the triple valve, and 14 represents the lower case which is substituted when converting the valve to the new form. This lower case is provided with a bolting flange 15 which mates with the flange 13, and is provided with a cylindrical chamber 16 somewhat larger in diameter than the chamber 12 and coaxial therewith.

17, 18, 19, 21, and 22 are ports formed in the lower case whose function is not material to the present invention beyond the fact that they communicate with correspondingly numbered ports in the insert later to be described.

A portion of the slide valve bushing of the triple valve appears at 23 and communicates by way of a passage 24 with the top of chamber 12. 25 represents the exhaust port leading through the slide valve bushing of the triple valve. The chamber 16 formed in the lower case 14 is counterbored at its upper end to provide a shoulder 26 upon which seats a shoulder formed on a flange 27 surrounding the insert.

The insert is indicated generally by the numeral 28. At its upper end it is provided with a peripheral flange 29 which positions the circular compressible gasket 31 which may be formed of a rubber compound. This gasket serves to seal the upper end of the insert 28 to the upper end of the chamber 12 in the body 11.

Underlying the lower end of the insert 28 is a gasket 32 which seals the lower end of the insert 28 at the lower end of the chamber 16. This gasket is formed with openings registering with the ports 17, 18, 19, 21, and 22. The gasket is also notched to permit passage of a positioning pin 33 which is pressed into the body 14 and which coacts with a notch 34 in the insert 28 to fix the angular position of this insert in the body.

In the particular device selected for illustration the insert 28 contains a slide valve bushing 35 with ports 36 which communicate with the port 17. There is also a cylinder bushing 37 in which works a piston (not shown) which is used to operate a slide valve controlling the ports 36. As stated, the particular mechanism mounted in the housing is not a feature of the invention.

The angular position of the lower case 14 with reference to the triple body 11 is determined by a tubular insert 38 pressed into one of the mating members and forming a continuation of a passage 39 whose function is not here material. The shoulder 26 and flange 27 are so dimensioned that when the insert 28 is in place, the flange 27 presents an upper surface which is flush with the bolting face of the flange 15. Supported partly in the flange 27 and partly on the seating face of the flange 15 is a gasket 41 which also seats on the flange 13. Consequently, this gasket functions to seal the joint between the flanges 13 and 15, and also forms a seal with the flange 27.

When the flanges 13 and 15 are drawn together by the bolts 42, the insert 28 is urged downward by the compression of both the gaskets 31 and 41, but its downward movement is limited by the shoulder 26. Consequently, the compression exerted on the gasket 32 is limited.

It follows from this arrangement that the insert is sealed at its top and bottom and also at its midlength and that all three gaskets are subjected to the proper degree or compression.

While the invention has been shown applied to a particular type of insert, it has in practice been successfully used with various different types of insert and no limitation to the particular form of insert is implied by the more or less specific description of a particular form.

What is claimed is:—

1. In a triple valve, the combination of a triple valve body having a bolting face from which extends an emergency piston chamber; a lower case having a companion bolting face from which extends a chamber alined with the chamber in the body, and counterbored to form a shoulder; an insert having a flange which seats on said shoulder and forms a continuation of the second-named bolting face; a compressible gasket interposed between the first-named bolting face on the one hand, and said flange and the second-named bolting face on the other hand; and compressible gaskets, one interposed between the end of the insert and the end of one chamber, and the other interposed between the other end of the insert and the end of the other chamber.

2. In a triple valve, the combination of a triple valve body having a bolting face from which extends an emergency piston chamber; a lower case having a companion bolting face from which extends a chamber alined with the chamber in the body, and counterbored to form a shoulder; an insert having a flange which seats on said shoulder and forms a continuation of the second-named bolting face; a compressible gasket interposed between the first-named bolting face on the one hand, and said flange and the second-named bolting face on the other hand; compressible gaskets, one interposed between the end of the insert and the end of one chamber, and the other interposed between the other end of the insert and the end of the other chamber, at least one of said gaskets being formed with a through port which registers with ports in the parts between which the gasket is interposed; and interengaging means between said insert and one of the members having a bolting face, said interengaging means determining the position of said insert.

3. In a triple valve, the combination of a triple valve body having a bolting face from which extends an emergency piston chamber; a lower case having a companion bolting face from which extends a chamber alined with the chamber in the body, and counterbored to form a shoulder; an insert having a flange which seats on said shoulder and forms a continuation of the second-named bolting face, said insert having a cylinder bushing, and an alined ported valve chamber bushing; a compressible gasket interposed between the first-named bolting face on the one hand, and said flange and the second-named bolting face on the other hand; and compressible gaskets, one interposed between the end of the insert and the end of one chamber, and the other interposed between the other end of the insert and the end of the other chamber.

4. In a triple valve, the combination of a triple valve body having a bolting face from which extends an emergency piston chamber; a lower case having a companion bolting face from which extends a chamber alined with the chamber in the body, and counterbored to form a shoulder; an insert having a flange which seats on said shoulder and forms a continuation of the second-named bolting face, said insert having a cylinder bushing and an alined ported valve chamber bushing open at one end to the space within the cylinder bushing and open at the other end to the chamber in the triple valve body; a compressible gasket interposed between the first-named bolting face on the one hand, and said flange and the second-named bolting face on the other hand, and compressible gaskets, one interposed between the end of the insert and the end of one chamber, and the other interposed between the other end of the insert and the end of the other chamber.

5. The combination of two members having mating faces provided with means for bolting them together, said faces having alined chambers extending from said mating faces, and one of said chambers having an annular shoulder, of an insert mounted in said chambers and positioned therein by engagement with said shoulder; gaskets one between each end of the insert and the end of the corresponding chamber; and a gasket interposed between one of said mating faces on the one hand, and the other mating face and a portion of the flange on said insert on the other hand.

6. The combination of claim 5 further characterized in that one of said members is provided with positioning means engaging said member and determining the position thereof.

7. The combination of claim 5 further characterized in that the mating faces are provided with interengaging means to determine their relative position and that the insert is provided with means interengaging with means on one of said connected members to fix the position of the insert with reference to said member.

In testimony whereof I have signed my name to this specification.

CHARLES A. CAMPBELL.